(12) United States Patent
James

(10) Patent No.: US 8,479,819 B2
(45) Date of Patent: Jul. 9, 2013

(54) METHOD OF CONSOLIDATING A FRACTURE IN A FORMATION

(75) Inventor: Simon James, Le Plessis-Robinson (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 314 days.

(21) Appl. No.: 12/811,234

(22) PCT Filed: Dec. 31, 2008

(86) PCT No.: PCT/EP2008/011156
§ 371 (c)(1),
(2), (4) Date: Oct. 4, 2010

(87) PCT Pub. No.: WO2009/083264
PCT Pub. Date: Jul. 9, 2009

(65) Prior Publication Data
US 2011/0120711 A1 May 26, 2011

(30) Foreign Application Priority Data

Jan. 3, 2008 (EP) ..................... 08150033

(51) Int. Cl.
*E21B 33/13* (2006.01)
*C09K 8/02* (2006.01)
*C09K 8/56* (2006.01)

(52) U.S. Cl.
USPC ............. 166/293; 166/300; 175/64; 175/72

(58) Field of Classification Search
None
See application file for complete search history.

(56) References Cited

U.S. PATENT DOCUMENTS

| 4,762,443 | A | 8/1988 | Gouvenot |
| 5,101,901 | A | 4/1992 | Shu et al. |
| 5,211,233 | A | 5/1993 | Shu |
| 2007/0114032 | A1* | 5/2007 | Stegent et al. ............... 166/287 |
| 2008/0060810 | A9* | 3/2008 | Nguyen et al. ............ 166/280.2 |

OTHER PUBLICATIONS

SPE 36899: Multiple Proppant Fracturing of a Horizontal Wellbore: an integration of two technologies M.R. Norris, Dowell Schlumberger, B.A. Berntsen, P. Myhre and W.J. Winters, Amoco Norway Oil Company, 1996.

* cited by examiner

*Primary Examiner* — Zakiya W Bates
(74) *Attorney, Agent, or Firm* — Michael Dae

(57) ABSTRACT

A method of consolidating a fracture in a formation comprises injecting a solution of an alkali metal silicate into the formation causing the solution to react with the surfaces of the calcium containing inorganic compound deposits, locking the fine material on these surfaces in place and preventing fines generation during production in a well.

18 Claims, No Drawings

METHOD OF CONSOLIDATING A FRACTURE IN A FORMATION

TECHNICAL FIELD

This invention relates to a method of consolidating or reinforcing a fractured formation. More particularly, the invention relates to a method of consolidating fractures in a formation around a wellbore.

BACKGROUND ART

Fines are sometimes produced during production in subterranean wells, such as oil or gas wells, or the like, which contain chalk or other calcium carbonates, or which contain sandstone which may or may not include calcium carbonate cementitious material. These fines can cause the fractures in the formation to become blocked and thus decrease the production rate of the well. It is necessary to consolidate these fines in a reliable way so that the fractures do not become blocked and well production is not hampered.

It is known to use calcium carbonate in a silicate containing solution in sealant compositions. U.S. Pat. No. 4,762,443 describes a fluid composition comprising a sodium metasilicate and a calcium carbonate which is used to make porous material impervious by injecting the composition into the material, which will then harden and set over time.

In some chalk formations such as, for example, the Valhall field in Norway, the chalk reservoir formation produces fines during production. The first completions in this field were cased-hole gravel stacks, but these were quickly blocked by the chalk fines production, as disclosed in Paper Number 36899-MS entitled "Multiple Proppant Fracturing of a Horizontal Wellbore: an integration of two technologies" 1996 published by the Society of Petroleum Engineers.

More recently wells have been completed with multiple propped hydraulic fractures. Although these have been very successful, there is still a tendency for the propped fractures to become plugged thus reducing production. The present invention has the advantage of providing a more reliable consolidation of the formation. It also further could be used to limit or prevent lost circulation in fractured carbonate formations.

DISCLOSURE OF INVENTION

A first aspect of the invention provides a method of consolidating a fracture in the formation around a well comprising:

injecting a solution of an alkali metal silicate into the formation, which causes the solution to react with the surfaces of the calcium containing inorganic compound deposits, locks the fine material on these surfaces in place and substantially prevents fines generation during production in the well.

Preferably the solution is sodium silicate with a $SiO_2$ to $Na_2O$ ratio<1.5, such as a sodium metasilicate which has a $SiO_2$ to $Na_2O$ ratio of 1:1, but other sodium silicates with $SiO_2$ to $Na_2O$ ratio>1.5 may be used. Also potassium or lithium silicates may be used.

A second aspect of the invention provides a method of consolidating a fracture in the formation around a well comprising:

injecting a solution of an alkali metal aluminate into the formation, which causes the solution to react with the surfaces of the calcium containing inorganic compound deposits, locks the fine material on these surfaces in place and substantially prevents fines generation during production in the well.

Preferably the alkali metal aluminate is sodium aluminate.

Preferably the calcium containing inorganic compound is calcium carbonate.

In one form of the invention the solution may be injected into the formation during perforation operations. In another form of the invention the solution may be injected into the formation after perforation. In yet a further form of the invention the solution may be injected into the formation by including it as a pre-pad during a fracturing operation. In another embodiment, the solution may be injected through a hole drilled in the casing which is subsequently plugged.

The solution may be injected into a plurality of fractures in the formation so as to minimise lost circulation in fractured carbonate formations.

In one form of the invention the solution of an alkali metal silicate may be added to the drilling fluid. In another form of the invention the solution of an alkali silicate may be in the form of a pill which is placed in front of the area of lost circulation or in regions of a cemented well where the cement has been attacked and degraded.

MODE(S) FOR CARRYING OUT THE INVENTION

The preferred embodiment of the invention is a method of consolidating a fracture in a formation which comprises injecting a solution of sodium silicate or sodium aluminate into the formation around a wellbore of an oil or gas well, or the like. This causes the solution of sodium silicate or sodium aluminate to react with the surfaces of the calcium containing inorganic compound deposits, such as calcium carbonate or chalk in the formation, the fine material is locked in place and the generation of fines is substantially prevented during production oil, gas or the like in the well.

Potassium or lithium silicates may be used in place of the sodium silicate.

The solution of sodium silicate reacts with the surface areas of calcium carbonate to form a hard impermeable mass on the surfaces of the calcium carbonate deposits in the fractures. When the calcium carbonate and the silicate solution mix calcium ions react with the silica in the solution to create calcium silicate hydrates. The inorganic compound calcium carbonate is found in rock formations and is also known as chalk, limestone, calcite. Dolomite formations can also be treated in this way.

The method of the invention can be performed by placing the solution in the wellbore whilst performing perforating operations, by a subsequent injection or by including the sodium silicate solution as a pre-pad during the fracturing operation. If necessary the solution can be pumped post fracture although this is not preferred as the consolidation of any chalk particles that have penetrated into the propped fracture may cause a significant production decrease.

The chemical reaction caused by injecting or pumping the solution can also be used to control lost circulation in fractured carbonates. Either a drilling fluid based on sodium metasilicate can be used or a pill of sodium metasilicate can be placed in front of the area of lost circulation. As the fluid penetrates the fractures it will start to react with the calcium carbonate along the fracture faces leading to gelation of the solution and consequent reduction in the lost circulation in the well fractures. The solution can also be used to consolidate sandstone formations containing some calcium carbonate and this can be used to control sand production. Treatment of sandstone formations can be done before or after initial production.

The preferred embodiment of the invention will now be described with reference to specific examples.

Calcium carbonate:

Socal® 31 (Solvay): a rhombohedral calcite (a precipitated calcium carbonate) with a mean particle size of 70 nm The calcium carbonate is formed by precipitation from a lime solution. The hydrophobically modified calcium carbonate is reacted with fatty acids in suspension.

Sodium metasilicate:

Sodium metasilicate (anhydrous) (available from Van Eyck Chimie). In the examples the sodium metasilicate is used as a solution containing 30 g of sodium metasilicate and 70 $g$ of distilled water.

Example 1 Showing Consolidation with Sodium Aluminate 50 g of fine calcium carbonate (Socal 31 from Solvay) was mixed with 150 g of Wata Floc (a 38% sodium aluminate solution from Eaglebrook Inc., Canada) and left to set for 1 week at room temperature. Subsequently, the set material was cored and cut into a cylinder 1 inch in diameter and 2 inches long. A compressive strength measurement showed that the sample had a compressive strength of 0.6 MPa.

Example 1 Showing Consolidation with Sodium Metasilicate

To demonstrate that the method of the invention leads to the setting of a solid, 30 g of calcium carbonate with a mean particle size of 70 nm (Socal® 31) is mixed in a Waring blender with 100 g of the sodium metasilicate solution, which contains 30 g sodium metasilicate and 70 g distilled water. The solids disperse easily in the solution and the resulting suspension is poured into a container. After 3 hours at room temperature the suspension had set into a solid homogenous mass. No excess fluid is present on the top of the solid.

Other changes can be made while staying within the scope of the invention.

The invention claimed is:

1. A method of consolidating or reinforcing a formation around a well that contains naturally occurring calcium-containing inorganic compound deposits, the method comprising: injecting a solution of an alkali metal silicate or alkali metal aluminate into the formation, so as to cause the solution to react with the surfaces of the calcium containing inorganic compound deposits and lock the fine material on these surfaces in place and substantially prevent fines generation during production in the well.

2. The method as claimed in claim 1, wherein the alkali metal silicate is sodium metasilicate.

3. The method as claimed in claim 1, wherein the alkali metal aluminate is sodium aluminate.

4. The method as claimed in claim 1, wherein the calcium containing inorganic compound is calcium carbonate.

5. The method as claimed in claim 1, wherein the solution is injected into the formation during perforation operations.

6. The method as in claim 1, wherein the solution is injected into the formation after perforation operations.

7. The method as in claim 1, wherein the solution is injected into the formation by including it as a pre-pad during a fracturing operation.

8. The method as in claim 1, wherein the solution is injected into a plurality of fractures in the formation so as to minimise a lost circulation zone in fractured carbonate formations.

9. The method as in claim 1, wherein the solution of an alkali metal silicate is added to a drilling fluid.

10. The method as in claim 9, wherein the solution of an alkali silicate is in the form of a pill which is placed in front of the area of lost circulation.

11. The method as in claim 1, wherein the formation to be treated comprises a cement layer around the well.

12. A method of consolidating or reinforcing a formation around a well that contains naturally occurring calcium-containing inorganic compound deposits, the method comprising: injecting a solution of an alkali metal silicate or alkali metal aluminate into the formation, so as to cause the solution to react with the surfaces of the calcium containing inorganic compound deposits and lock the fine material on these surfaces in place and substantially prevent fines generation during production in the well, wherein the method further comprises positioning a tool containing the solution adjacent a formation to be treated and using the tool to inject the solution into the formation.

13. The method according to claim 12, wherein the alkali metal silicate is sodium metasilicate.

14. The method according to claim 12, wherein the alkali metal aluminate is sodium aluminate.

15. The method according to claim 12, wherein the solution is injected into a plurality of fractures in the formation so as to minimise a lost circulation zone in fractured carbonate formations.

16. A method for treating lost circulation in a formation around a well that contains naturally occurring calcium-containing inorganic compound deposits, the method comprising: adding a solution of an alkali metal silicate or alkali metal aluminate to a drilling fluid to be pumped into the formation, so as to cause the solution to react with the surfaces of the calcium containing inorganic compound deposits and lock the fine material on these surfaces in place and substantially prevent fines generation during production in the well.

17. The method according to claim 16, wherein the solution of an alkali silicate is in the form of a pill which is placed in front of the area of lost circulation.

18. The method according to claim 16, wherein the alkali metal silicate is sodium metasilicate.

* * * * *